United States Patent [19]
Nagano

[11] Patent Number: 6,055,464
[45] Date of Patent: Apr. 25, 2000

[54] ELECTRONIC DEVICE AND OPERATING MODE CONTROL METHOD THEREOF

[75] Inventor: Susumu Nagano, Chiba, Japan

[73] Assignee: Sony Corporation, Tokyo, Japan

[21] Appl. No.: 08/634,359

[22] Filed: Apr. 18, 1996

[30] Foreign Application Priority Data

Apr. 21, 1995 [JP] Japan ................................. 7-120882

[51] Int. Cl.[7] .............................. G06F 13/40; G06F 13/14
[52] U.S. Cl. .......................... 700/295; 700/298; 700/297; 395/287
[58] Field of Search ........................... 395/287; 700/295, 700/298, 297

[56] References Cited

U.S. PATENT DOCUMENTS

| | | | |
|---|---|---|---|
| 4,149,241 | 4/1979 | Patterson | 364/200 |
| 5,327,428 | 7/1994 | Van As et al. | 370/353 |
| 5,537,600 | 7/1996 | Fuoco et al. | 395/800 |
| 5,590,341 | 12/1996 | Matter | 395/750 |

*Primary Examiner*—William Grant
*Assistant Examiner*—Iván Calcaño
*Attorney, Agent, or Firm*—Frommer Lawrence & Haug, LLP.; William S. Frommer

[57] ABSTRACT

An electronic device employed in a system where packets are sent and received between a plurality of electronic devices connected by a bus, with a bias voltage not being outputted to the bus in a first operating mode operated in from when a power supply is thrown until an internal initialization process is complete and a bias voltage is outputted to the bus in a second operating mode operated in after the initialization process is complete so that communication system hang-ups at the time of throwing the power supply can be avoided.

12 Claims, 3 Drawing Sheets

111~113 : P1394 serial buses

ELECTRONIC DEVICE AND OPERATING MODE CONTROL METHOD THEREOF

BACKGROUND OF THE INVENTION

The present invention relates to electronic devices connected to, for example, P1394 serial buses, and in particular to operating mode control technology for preventing hang-ups during bus resets.

Systems where electronic devices such as personal computers, digital tape recorders and digital television receivers are connected using a P1394 serial bus and packets for digital video signals, digital audio signals and control signals are sent and received between these electronic devices can be considered.

An example of this kind of system is shown in FIG. 4. In FIG. 4, the electronic devices A to D are the aforementioned personal computers and digital video tape recorders etc. P1394 serial bus cables 111, 112 and 113 then make connections across the ports P of the electronic devices A and B, B and C and C and D. These electronic devices are referred to as nodes in the following specification.

A pair of shielded twisted-pair cables (not shown in the drawings) are provided within these P1394 serial cables. Of this pair of twisted-pair cables, one pair is used for data transmission and the other pair is used for strobe signal transmission. Further, each node outputs a bias voltage for one twisted-pair cable and the bias voltage is detected on the other twisted-pair cable.

As shown in FIG. 4, each of the nodes is equipped with a physical layer controller (PHY) 114, a link layer controller (LINK) 115 and a central processing unit (hereinafter referred to as "CPU") 116 as a basic structure for carrying out communications on the P1394 serial bus. The physical layer controller 114 has functions for bus initialization, data encoding/decoding, arbitration and bias voltage output/detection etc. Further, the link layer controller 115 has link layer controller functions for error correction code generation/detection and packet generation/detection etc. The CPU 116 has an application layer function.

With the communication system constructed in this way, when the power supply of node A goes from off to on with the nodes B to D on in a normal operating state, a power supply voltage is supplied to the physical layer controller 114, the link layer controller 115 and the CPU 116 of the node A and normal operation begins.

At this time, the physical layer controller 114 outputs a bias voltage onto the twisted-pair cable of the P1394 serial bus cable 111. This bias voltage is detected by the physical layer controller of node B connected directly by the P1394 serial bus cable 111. As a result, the node B knows that node A is connected by the P1394 serial bus cable 111.

In this way, if a new node is connected to the bus, a bus reset occurs when the bias voltage outputted to the bus by the physical layer controller of this node is detected by the physical layer controllers of the other nodes and physical address allocation for each node by the physical layer controllers of each node is automatically completed within at least 170 μsec. The details of this point are defined in the specification for the IEEE-P1394 serial bus and a detailed description is therefore omitted.

When a bus reset occurs and physical address allocation for each of the nodes is complete, the nodes B to D commence transactions necessary at the time of bus reset decided by the protocol. For example, a packet for interrogating as to what type of equipment etc. the node A belongs to is transmitted. The transaction is then completed by the node A correctly transmitting a packet in response to the interrogation.

However, usually, the CPU 116 has to carry out various internal initialization processes directly after the power supply is thrown (turned on). The time is necessary for changes depending on what kind of machine the node is and what process the node is carrying out, but is usually from a few tens of milliseconds to a few seconds. Other nodes cannot then receive response packets from node A because node A cannot respond to interrogations from other nodes during this time. The node A therefore experiences a time-out and the system may hang up.

For example, in order to carry out Isochronous (hereinafter abbreviated to "Iso") communications, a transaction is generated for carrying out confirmation of the communication channel and band for a uniquely designated resolver node when resetting the bus. However, if the node A becomes the resolver node, other nodes cannot start ISO communication until the node A completes initialization.

In order to resolve these kinds of problems, the object of the present invention is to provide an electronic device and operating mode control method which do not cause the communications system to hang-up when the power supply is thrown.

SUMMARY OF THE INVENTION

In order to achieve this object, according to the present invention, an electronic device is employed in a system where packets are sent and received between a plurality of electronic devices connected by a bus, in such a manner that a bias voltage is not outputted to the bus in a first operating mode operated in from when a power supply is thrown until an internal initialization process is complete and a bias voltage is outputted to the bus in a second operating mode operated in after the initialization process is complete.

The initialization process can be an initialization of internal information necessary for transmitting and receiving packets. The electronic device can have a physical layer controller for outputting the bias voltage and the initialization process can be carried out by a central processing unit.

Further, according to the present invention, an operating mode control method for an electronic device employed in a system for carrying out communication between a plurality of electronic devices connected by a bus, comprises the steps of configuring the electronic device in such a manner that a bias voltage is not outputted to the bus in a first operating mode operated in from when a power supply is thrown until an internal initialization process is complete and outputting a bias voltage to the bus in a second operating mode operated in after the initialization process is complete.

The initialization process can be an initialization of internal information necessary for transmitting and receiving packets.

According to the present invention, a bias voltage is not outputted to the bus from when the power supply is thrown until an internal initialization process is complete and a bias voltage is outputted to the bus after an internal initialization process is complete.

DETAILED DESCRIPTION OF THE PREFERRED EMBODIMENTS

The following is a detailed description with reference to the drawings of an embodiment of the present invention.

Figure 1:
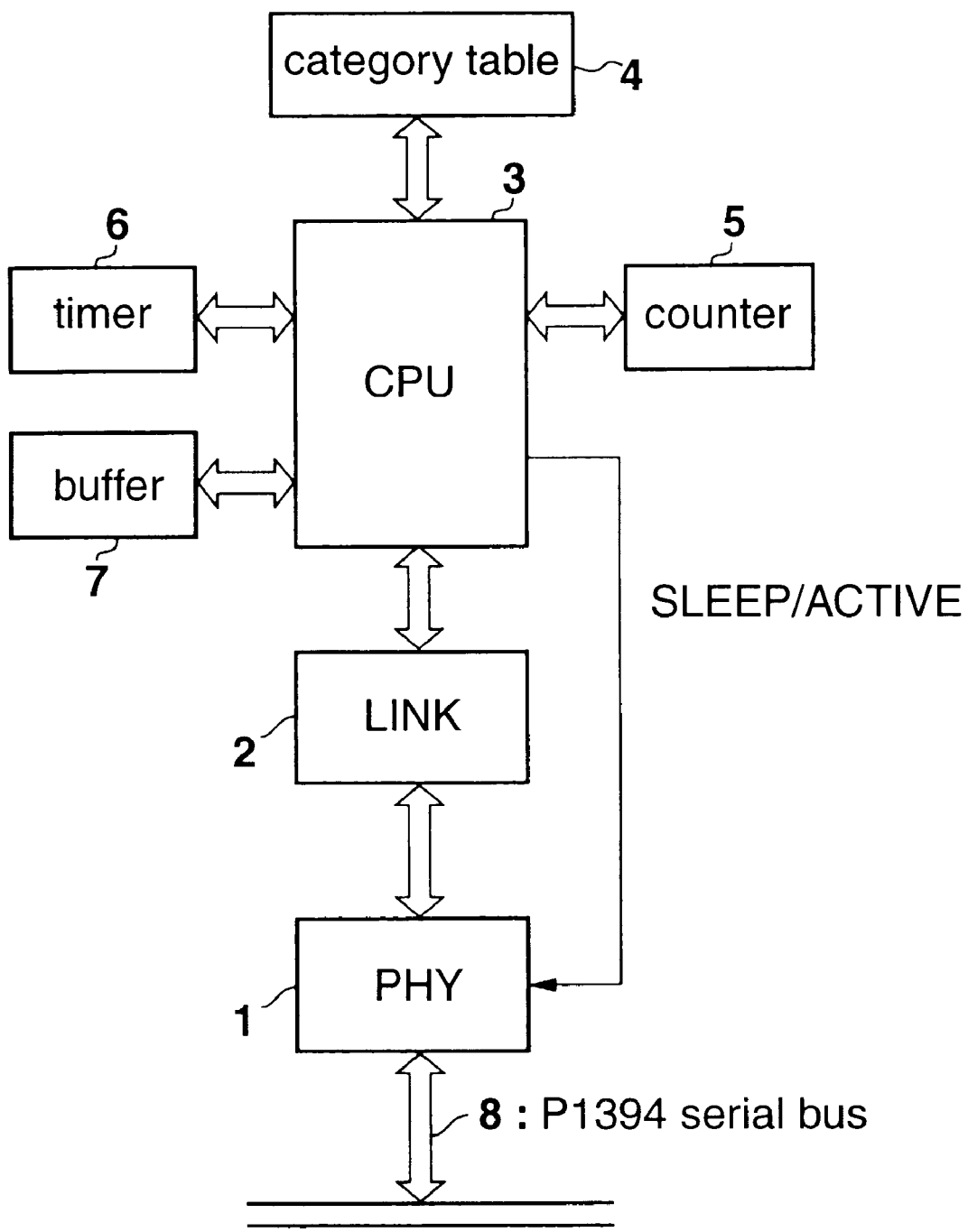
FIG. 1 is a view showing an example of a system for carrying out communications with a plurality of nodes connected by a P1394 serial bus.

FIG. 1 is a block diagram showing the essential parts of the structure of a node according to an embodiment of the present invention. As shown in FIG. 1, the node of this embodiment is equipped with a physical layer controller 1, a link layer controller 2 connected to the physical layer controller 1 by the internal bus, a CPU 3 connected to the link layer controller 2 by the internal bus, and a category table 4, counter 5, timer 6 and buffer 7 also connected to the CPU 3 by the internal bus. A P1394 serial bus 8 is connected to the port (not shown in the diagrams) of the physical layer controller 1. Further, the CPU 3 is constructed in such a manner as to control the operating modes of the physical layer controller 1 (described in detail later).

In this embodiment, the physical layer controller 1 has two operating modes, a sleep mode (1) and an active mode (2). In sleep mode, the physical layer controller does not output a bias voltage to the bus even if a power supply voltage is provided and transmitting and receiving of packets is not carried out. The physical layer controller 1 carries out normal operation in active mode, i.e. a bias voltage is outputted to the bus and packets are transmitted and received.

Figure 2:
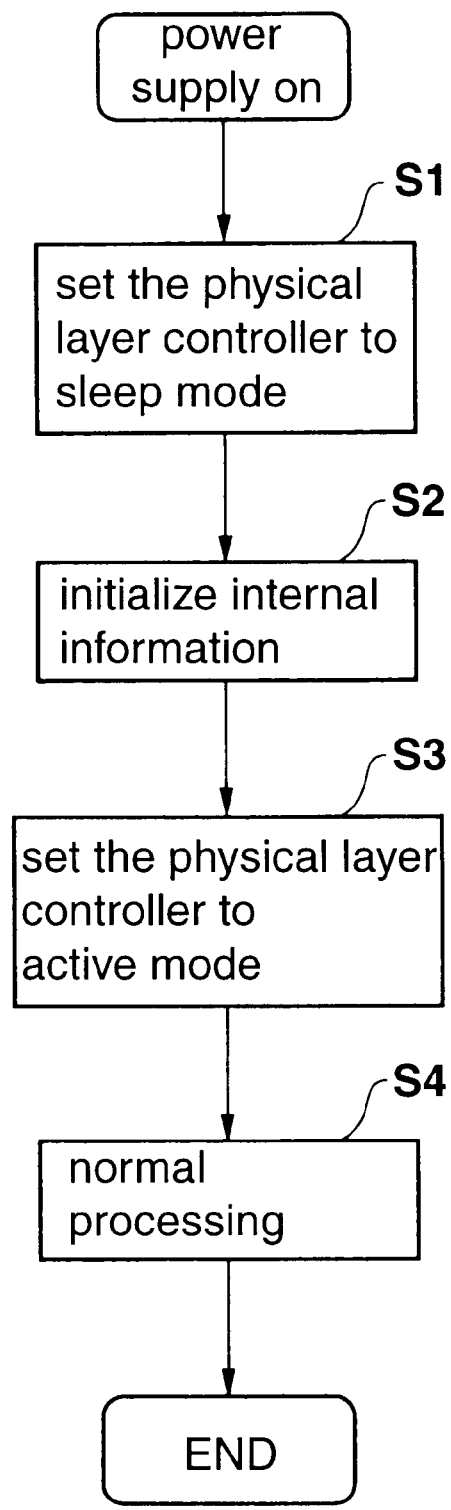
FIG. 2 is a block view showing the structure of the essential parts of a node according to an embodiment of the present invention.

Next, the operation is described at the time of throwing of the power supply for the node shown in FIG. 1. FIG. 2 is a flowchart showing the operation of the CPU 3 shown in FIG. 1.

When the power supply for the node goes on, the CPU 3 first sends out a control signal (step S1) for putting the physical layer controller 1 into sleep mode. In this way, the physical layer controller 1 goes into sleep mode and the operation of outputting a bias voltage to the bus is not carried out even if a power supply voltage is provided so that a bus reset does not occur. Further, on the other hand, even if the physical layer controller 1 outputs a bias voltage and a bus reset occurs sooner than the sending-out of a control signal for putting the physical layer controller 1 into sleep mode, a bus reset occurs again soon to put the physical layer controller 1 into sleep mode and the communications system goes into an un-connected state.

Next, the internal initialization process for the category table 4, the counter 5, the timer 6 and the buffer 7 is carried out and the physical layer controller 1 undergoes a transition (step S2 and S3) into active mode if a state where a transaction process can be carried out is attained.

The internal initialization process consists of the following internal information initialization processes for starting transactions: initialization of a table for managing whether or not a response transaction has come for a sent request transaction; a timer initialization used in cases where a response transaction for a sent request transaction is waited for; initialization of a table used when it is necessary to re-send a sent request transaction or response transaction; and an initialization of a transmitted number counter used when it is necessary to re-send a sent request transaction or a response transaction. When the CPU 3 controls other integrated circuits (not shown in the drawings) there are also other initialization processes i.e. a buffer initialization and an integrated circuit initialization for carrying out communications with the other integrated circuits.

In step S3, the physical layer controller 1 goes into active mode and this node outputs a bias voltage to the bus. In this way, this node and other nodes connected by the bus are aware that a new node has been connected to the communications system and a bus reset occurs. The aforementioned various transaction processes (step S4) are then carried out between this node and other nodes. At this time, a state such as that for the related art where, for example ISO communications cannot be carried out does not occur because the initialization process for this node is already complete.

Next, an example of the circuit structure for a physical layer controller for executing the aforementioned operation is described with reference to FIG. 3.

Figure 3:
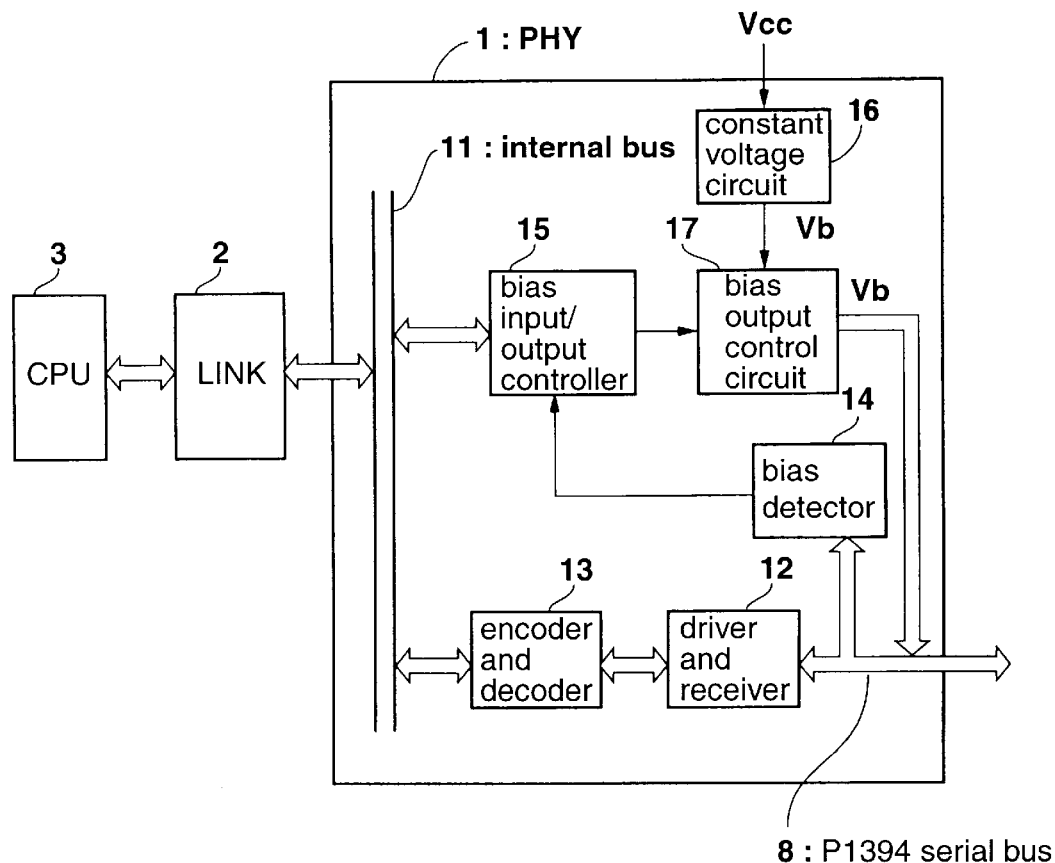
FIG. 3 is a flowchart showing the operation of the CPU 3 of FIG. 1.
Figure 4:
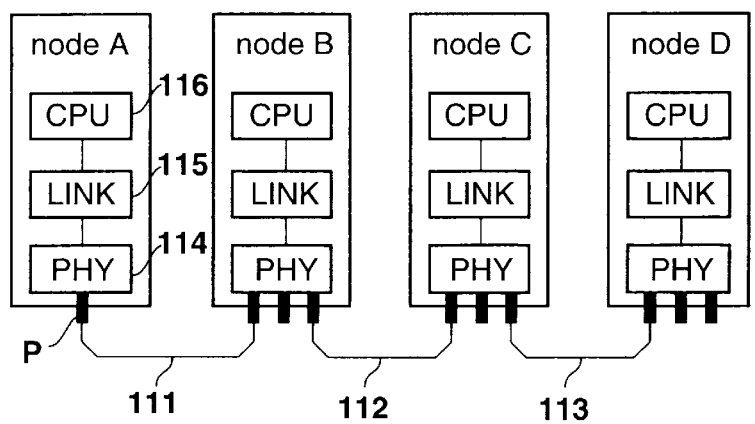
FIG. 4 is a block diagram showing an example of the structure of the physical layer controller of FIG. 2.

As shown in FIG. 3, the physical layer controller 1 is connected to a link layer controller 2 by the internal bus 11, with other nodes (not shown in the drawings) being connected by a P1394 serial bus 8.

A driver and receiver 12 connected to the P1394 serial bus and an encoder and decoder 13 connected to the driver and receiver 12 are provided within the physical layer controller 1 as a circuit for transmitting and receiving signals to and from the P1394 serial bus 8. The driver and receiver 12 carries out transmitting and receiving of signals for the P1394 serial bus. The encoder and decoder 13 carries out transmission signal encoding and receive-signal decoding, as well as carrying out communications with the CPU 3 and link layer controller 2 via the internal bus 11. The driver and receiver 12 and the encoder and decoder 13 do not participate in the control of the operating modes of the physical layer controller 1.

A bias detector circuit 14 for detecting a bias voltage on the bus, a bias input/output controller 15 for sending a detection output of detection circuit 14 from the link layer controller 2 to the CPU 3 via the internal bus 11 and transmitting a bias outputted instruction sent from the CPU 3 to a bias output control circuit 17 to be described later, a constant voltage circuit 16 for generating a bias voltage Vb outputted to the P1394 serial bus 8 from a voltage Vcc generated by a power supply circuit (not shown in the drawings), and a bias output control circuit 17 controlled to be on and off based on a bias output instruction sent from the bias input/output controller 15 in such a manner as to output the bias voltage Vb generated by the constant voltage circuit 16 to the P1394 serial bus 8 are provided within the physical layer controller 1.

In FIG. 3, when the physical layer controller of an opposing node connected using the P1394 serial bus 8 goes into active mode and a bias voltage is provided on the P1394 serial bus 8, this bias voltage is detected by the bias detector 14 and sent to the bias input/output controller 15. The bias voltage is then sent through the link layer controller 2 to the CPU 3 via the internal bus 11. In this way, the CPU 3 is aware that the physical layer controller of an opposing node has outputted a bias voltage onto the bus.

In FIG. 3, the CPU 3 sends an instruction signal for setting up the sleep mode at the physical layer controller 1 to the bias input/output controller 15 until the internal initialization process described with reference to FIG. 2 is complete. The bias input/output controller 15 then receives this instruction signal and instructs the bias output control circuit 17 not to output the bias voltage Vb generated by the constant voltage circuit 16 to the P1394 serial bus 8. As a result, the bias voltage Vb is not outputted to the twisted pair cable of the P1394 serial bus 8 because the bias voltage Vb generated by the constant voltage circuit 16 cannot pass through the bias output control circuit 17.

Then, in FIG. 3, the CPU 3 sends an instruction signal for setting up the active mode at the physical layer controller 1 to the bias input/output controller 15 when the internal initialization process is complete. The bias input/output controller 15 then receives this instruction signal and instructs the bias output control circuit 17 to output the bias voltage Vb generated by the constant voltage circuit 16 to the P1394 serial bus 8. As a result, the bias voltage Vb generated by the constant voltage circuit 16 passes through the bias output control circuit 17 and is outputted to the twisted pair cable of the P1394 serial bus 8. The bias voltage outputted to the P1394 serial bus 8 is detected by physical layer controllers of nodes connected to this bus 8 and a bus reset occurs as a result.

The present invention is by no means limited to the aforementioned embodiments and various modifications are possible based on the object of the present invention providing these modifications do not stray from the scope of the present invention. For example, in the aforementioned embodiment, sleep mode for the physical layer controller is when the power supply voltage Vcc is provided but the bias voltage is not outputted to the bus. However, sleep mode may also be when the power supply voltage Vcc is not provided, with the effect that the bias voltage is not outputted to the bus.

As described above, according to the present invention, an operation mode is set-up where a bias voltage is not outputted to the bus from when the power supply is thrown until the initialization process is complete and a bus reset therefore does not occur until the initialization process is complete. For example, even if an instantaneous bias voltage is outputted and a bus reset occurs, the outputting of the bias voltage will be halted sufficiently quickly enough for the system to not hang up, the bus will be reset again and the communication system will be in a non-connected state. As a result, communication system hang-ups at the time of throwing the power supply can be avoided.

What is claimed is:

1. An electronic device connected to other electronic devices by a bus supporting isochronous and asynchronous data communication, comprising:

means for setting first and second operating modes of said electronic device, wherein said first operating mode starts when power is supplied to said electronic device and ends when an internal initialization process is completed therein, and said second operating mode starts after the completion of said internal initialization process;

means for generating a bias voltage;

means for controlling whether said bias voltage is output to said bus based on whether said electronic device has been set in said first or second operating mode; and means for stopping, said second operating mode if said second operating mode starts before the completion of said internal initialization process.

2. The electronic device according to claim 1, further comprising means for outputting said bias voltage to said bus in response to said means for controlling, wherein said bias voltage is not output in said first operating mode and is output in said second operating mode.

3. The electronic device according to claim 1, wherein said means for setting performs said internal initialization process for initializing said electronic device to transmit and receive data packets to/from said other electronic devices.

4. The electronic device according to claim 1, further comprising means for detecting whether said bias voltage is present on said bus.

5. An electronic device connected to other electronic devices by a bus supporting isochronous and asynchronous data communication, comprising:

a first controller for setting first and second operating modes of said electronic device, wherein said first operating mode starts when power is supplied to said electronic device and ends when an internal initialization process is completed therein, and said second operating mode starts after the completion of said internal initialization process;

a voltage generator for generating a bias voltage; and a second controller for controlling whether said bias voltage is output to said bus based on whether said electronic device has been set in said first or second operating mode wherein said second controller stops said second operating mode if said second operating mode starts before the completion of said internal initialization process.

6. The electronic device according to claim 5, further comprising a bias output circuit for outputting said bias voltage to said bus in response to said second controller, wherein said bias voltage is not output by said bias output circuit in said first operating mode and is output by said bias output circuit in said second operating mode.

7. The electronic device according to claim 5, wherein said first controller performs said internal initialization process for initializing said electronic device to transmit and receive data packets to/from said other electronic devices.

8. The electronic device according to claim 5, further comprising a detector for detecting whether said bias voltage is present on said bus.

9. A method for controlling an electronic device connected to other electronic devices by a bus that supports isochronous and asynchronous data communication, said method comprising:

setting first and second operating modes of said electronic devices, wherein said first operating mode starts when power is supplied to said electronic device and ends when an internal initialization process is completed therein, and said second operating mode starts after the completion of said internal initialization process;

generating a bias voltage;

controlling whether said bias voltage is output to said bus based on whether said electronic device has been set in said first or second operating mode; and stopping said second operating, mode if said second operating mode starts before the completion of said internal initialization process.

10. The method according to claim 9, further comprising outputting said bias voltage in said second operating mode and not outputting said bias voltage in said first operating mode.

11. The method according to claim 9, wherein said internal initialization process is performed for initializing said electronic device to transmit and receive data packets to/from said other electronic devices.

12. The method according to claim 9, further comprising detecting whether said bias voltage is present on said bus.

* * * * *